US012634910B2

(12) United States Patent
Li et al.

(10) Patent No.: US 12,634,910 B2
(45) Date of Patent: May 19, 2026

(54) METHOD FOR SELECTING INITIAL BANDWIDTH PART (BWP), TERMINAL DEVICE AND NETWORK DEVICE

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 433 days.

(21) Appl. No.: 18/089,272

(22) Filed: Dec. 27, 2022

(65) Prior Publication Data

US 2023/0209526 A1 Jun. 29, 2023

Related U.S. Application Data

(63) Continuation of application No. PCT/CN2020/105458, filed on Jul. 29, 2020.

(51) Int. Cl.
*H04W 72/542* (2023.01)
*H04W 24/10* (2009.01)
*H04W 72/0457* (2023.01)

(52) U.S. Cl.
CPC ....... *H04W 72/0457* (2023.01); *H04W 24/10* (2013.01); *H04W 72/542* (2023.01)

(58) Field of Classification Search
None
See application file for complete search history.

(56) References Cited

U.S. PATENT DOCUMENTS

| 12,278,688 | B2 * | 4/2025 | Qiao | ...................... H04W 72/23 |
| 2011/0236761 | A1 | 9/2011 | Endo et al. | |
| 2019/0140281 | A1 | 5/2019 | Li et al. | |
| 2019/0394776 | A1 | 12/2019 | Lee et al. | |
| 2020/0044723 | A1 * | 2/2020 | Cirik | ........................ H04L 5/001 |

(Continued)

FOREIGN PATENT DOCUMENTS

| CN | 104409681 A | 3/2015 |
| CN | 106099043 A | 11/2016 |

(Continued)

OTHER PUBLICATIONS

Guangdong Oppo Mobile Telecommunications Corp., Ltd., PCT/CN2020/105458, International Search Report and Written Opinion, Apr. 16, 2021, 14 pgs.

(Continued)

*Primary Examiner* — Khaled M Kassim
*Assistant Examiner* — Shima Wasel
(74) *Attorney, Agent, or Firm* — Morgan, Lewis & Bockius LLP

(57) ABSTRACT

Provided are a method for selecting an initial bandwidth part (BWP), a terminal device and a network device. The method includes: determining, by a terminal device, a target initial BWP among a plurality of initial BWPs for a first cell according to measurement results of a plurality of reference signal beams in the first cell. Each initial BWP in the plurality of initial BWPs is associated with at least one reference signal beam, and the first cell is a cell which the terminal device currently camps on.

8 Claims, 8 Drawing Sheets

100

(56) References Cited

U.S. PATENT DOCUMENTS

| | | | |
|---|---|---|---|
| 2020/0052782 A1* | 2/2020 | Wang | H04B 7/18541 |
| 2020/0359223 A1* | 11/2020 | Kim | H04W 72/23 |
| 2020/0381774 A1 | 12/2020 | Ueno et al. | |
| 2020/0413392 A1* | 12/2020 | Purkayastha | H04W 36/0088 |
| 2021/0119697 A1* | 4/2021 | Wang | H04B 7/1853 |
| 2021/0159966 A1* | 5/2021 | Xi | H04B 7/0695 |
| 2021/0176656 A1* | 6/2021 | Sang | H04W 36/302 |
| 2021/0242935 A1* | 8/2021 | Sakhnini | H04B 7/18543 |
| 2021/0258897 A1* | 8/2021 | Ma | H04L 5/0023 |
| 2021/0410186 A1* | 12/2021 | Hajir | H04W 72/044 |
| 2022/0006600 A1* | 1/2022 | Ma | H04L 5/0035 |
| 2022/0007346 A1* | 1/2022 | Ma | H04L 5/0098 |
| 2022/0007351 A1* | 1/2022 | Ma | H04W 72/23 |
| 2022/0086671 A1* | 3/2022 | Hong | H04W 16/28 |
| 2022/0086715 A1* | 3/2022 | Hong | H04B 7/2041 |
| 2022/0225421 A1* | 7/2022 | Miao | H04B 7/088 |
| 2023/0164711 A1* | 5/2023 | Ma | H04B 7/0695 370/503 |
| 2023/0179294 A1* | 6/2023 | Kuang | H04B 7/2041 370/316 |
| 2023/0199748 A1* | 6/2023 | Miao | H04W 72/12 370/329 |

FOREIGN PATENT DOCUMENTS

| | | |
|---|---|---|
| CN | 108258249 A | 7/2018 |
| CN | 208298924 U | 12/2018 |
| CN | 109786708 A | 5/2019 |
| CN | 110265665 A | 9/2019 |
| CN | 110400933 A | 11/2019 |
| CN | 110429240 A | 11/2019 |
| CN | 110444764 A | 11/2019 |
| CN | 110445565 A | 11/2019 |
| CN | 110474114 A | 11/2019 |
| CN | 111212449 A | 5/2020 |
| EP | 3483900 A1 | 5/2019 |
| JP | H08329978 A | 12/1996 |
| JP | 2000100437 A | 4/2000 |
| JP | 2015216007 A | 12/2015 |
| WO | WO2019195528 A1 | 10/2019 |
| WO | WO2020092752 A1 | 5/2020 |
| WO | WO/2022021130 A1 | 2/2022 |

OTHER PUBLICATIONS

Huawei, HiSilicon; "Remaining issues on initial DL/UL active bandwidth part", 3GPP TSG RAN WG1 Meeting #91 (R1-1719379), Reno, USA, Nov. 27-Dec. 1, 2017, 3 pgs.

3GPP TR 38.821 V1.0.0 (Dec. 2019); Technical Specification Group Radio Access Network; Solutions for NR to support non-terrestrial networks (NTN) (Release 16), 143 pgs.

Guangdong Oppo Mobile Telecommunications Corp., Ltd., CN201910731186.0, First Office Action, Jun. 3, 2020, 12 pgs.

Guangdong Oppo Mobile Telecommunications Corp., Ltd., CN201910731186.0, Notice of Allowance, Sep. 17, 2020, 5 pgs.

Guangdong Oppo Mobile Telecommunications Corp., Ltd., EP20850953.9, Extended European Search Report, Jul. 28, 2022, 7 pgs.

Guangdong Oppo Mobile Telecommunications Corp., Ltd., EP20850953.9, Notice of Allowance, Feb. 10, 2023, 67 pgs.

Guangdong Oppo Mobile Telecommunications Corp., Ltd., PCT/CN2020/106468, International Search Report and Written Opinion, Oct. 29, 2020, 39 pgs.

Yang Yu, Non-Final Office Action, U.S. Appl. No. 17/589,711, Jul. 18, 2023, 10 pgs.

Yang Yu, Notice of Allowance, U.S. Appl. No. 17/589,711, Oct. 25, 2023, 7 pgs.

Guangdong Oppo Mobile Telecommunications Corp., Ltd., EP20947679.5, Extended European Search Report, Aug. 4, 2023, 9 pgs.

Guangdong Oppo Mobile Telecommunications Corp., Ltd., EP20947679.5, First Office Actions/Search Report, Jan. 30, 2026, 8 pgs.

* cited by examiner

100

200

Determine, by a terminal device, a target initial BWP among a plurality of initial BWPs for a first cell according to measurement results of a plurality of reference signal beams in the first cell, where each initial BWP in the plurality of initial BWPs is associated with at least one reference signal beam, and the first cell is a cell which the terminal device currently camps on   S210

FIG. 3 channel quality

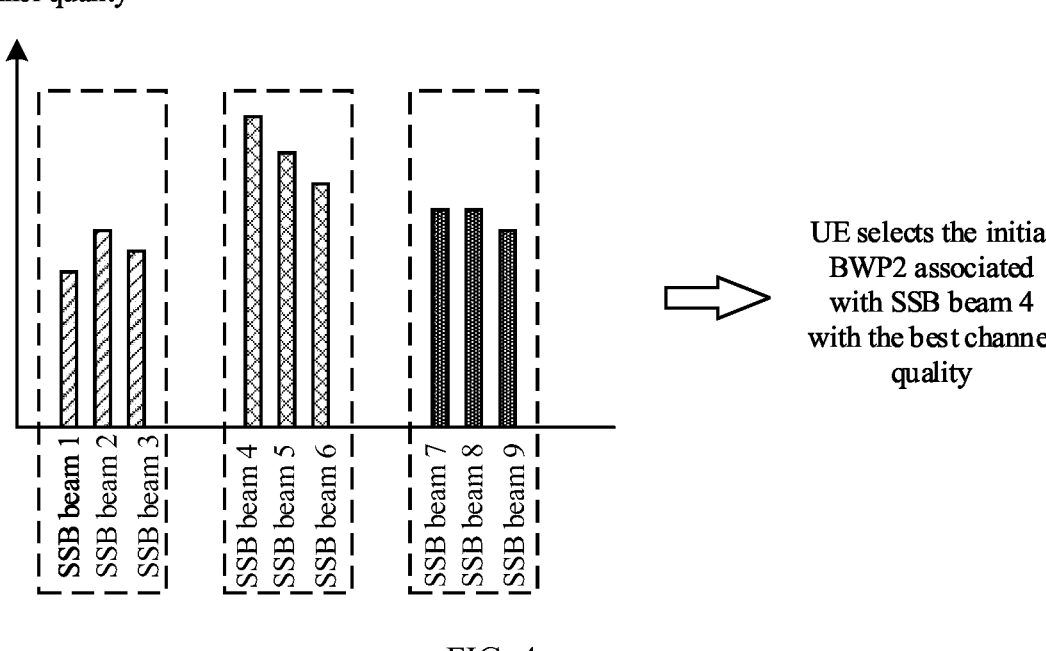

UE selects the initial BWP2 associated with SSB beam 4 with the best channel quality

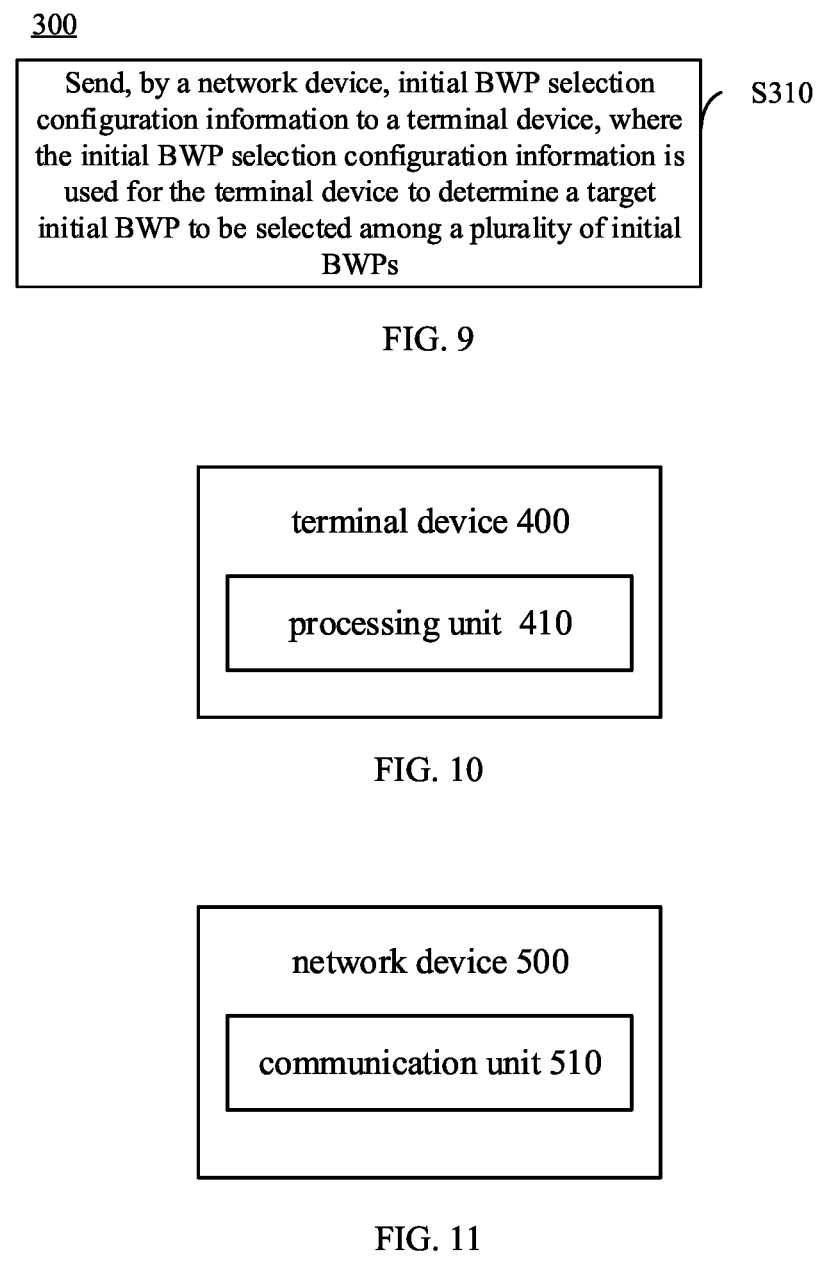

Send, by a network device, initial BWP selection configuration information to a terminal device, where the initial BWP selection configuration information is used for the terminal device to determine a target initial BWP to be selected among a plurality of initial BWPs ⟩ S310

FIG. 9 terminal device 400 processing unit 410

FIG. 10 network device 500 communication unit 510

FIG. 11

METHOD FOR SELECTING INITIAL BANDWIDTH PART (BWP), TERMINAL DEVICE AND NETWORK DEVICE

CROSS-REFERENCE TO RELATED APPLICATIONS

This application is a continuation of International Application No. PCT/CN2020/105458, filed Jul. 29, 2020, the entire disclosure of which is incorporated herein by reference.

TECHNICAL FIELD

Embodiments of the present disclosure generally relate to the communication technical field, and more specifically, to a method for selecting an initial Bandwidth Part (BWP), a terminal device and a network device.

BACKGROUND

For a terminal device in a non-connected state, a cell defining Synchronization Signal Block (CD-SSB) may be used to obtain Master Information Block (MIB) and System Information Block (SIB)1 information of a cell which the terminal device camps on, and to obtain information related to configuration of an initial Bandwidth Part (initial BWP) used for initial access, e.g., containing information related to configuration of an initial uplink BWP and an initial downlink BWP.

In communication systems, satellite communication is considered to provide communication services to users. Satellites use multiple beams to cover the ground, and one satellite may form dozens or even hundreds of beams to cover the ground. One satellite beam may cover a ground area of tens to hundreds of kilometers in diameter. In order to reduce the co-channel interference between different satellite beams, a network deployment may use different frequency points/carriers/bands for adjacent satellite beams. One way is to configure different BWPs within the same cell for different satellite beams, so that the terminal does not need to perform cell handover when moving between satellite beams, and only needs to perform BWP switching within the cell. For a terminal device in a non-connected state, it is needed to configure multiple different initial BWPs for different satellite beams. In this case, how to select an initial BWP is an urgent problem to be solved.

SUMMARY

Embodiments of the present disclosure provide a method for selecting an initial BWP, a terminal device and a network device, which are beneficial for selection to an initial BWP with better channel quality and can improve the communication performance.

According to a first aspect, there is provided a method for selecting an initial BWP, including: determining, by a terminal device, a target initial BWP among a plurality of initial BWPs for a first cell according to measurement results of a plurality of reference signal beams in the first cell, wherein each initial BWP in the plurality of initial BWPs is associated with at least one reference signal beam, and the first cell is a cell which the terminal device currently camps on.

According to a second aspect, there is provided a method for selecting an initial BWP, including: sending, by a network device, initial BWP selection configuration information to a terminal device, wherein the initial BWP selection configuration information is used for the terminal device to determine a target initial BWP to be selected among a plurality of initial BWPs.

According to a third aspect, there is provided a terminal device configured to perform the method according to the first aspect or any possible implementation of the first aspect. Specifically, the terminal device includes unit(s) configured to perform the method according to the first aspect or any possible implementation of the first aspect.

According to a fourth aspect, there is provided a network device configured to perform the method according to the second aspect or any possible implementation of the second aspect. Specifically, the network device includes unit(s) configured to perform the method according to the second aspect or any possible implementation of the second aspect.

According to the fifth aspect, there is provided a terminal device including a processor and a memory, wherein the memory is used for storing a computer program, and the processor is configured to call and run the computer program stored in the memory to perform the method according to the first aspect or respective implementations of the first aspect.

According to the sixth aspect, there is provided a network device including a processor and a memory, wherein the memory is used for storing a computer program, and the processor is configured to call and run the computer program stored in the memory to perform the method according to the second aspect or respective implementations of the second aspect.

According to a seventh aspect, there is provided a chip configured to perform the method according to any one of the first and second aspects or respective implementations of any one of the first and second aspects.

Specifically, the chip includes a processor configured to call and run a computer program from a memory to cause a device in which the chip is installed to perform the method according to any one of the first and second aspects or respective implementations of any one of the first and second aspects.

According to an eighth aspect, there is provided a computer-readable storage medium for storing a computer program, wherein the computer program causes a computer to perform the method according to any one of the first and second aspects or respective implementations of any one of the first and second aspects.

According to a ninth aspect, there is provided a computer program product including computer program instructions which cause a computer to perform the method according to any one of the first and second aspects or respective implementations of any one of the first and second aspects.

According to a tenth aspect, there is provided a computer program. When the computer program runs on a computer, the computer is caused to perform the method according to any one of the first and second aspects or respective implementations of any one of the first and second aspects.

Based on the above technical solutions, according to the measurement results of multiple reference signal beams in the cell which the terminal device camps on, the terminal device can select the target initial BWP among multiple initial BWPs for the cell. The technical solutions are conducive to selecting to the initial BWP with good channel quality, and can thus ensure the communication success rate of the terminal device.

BRIEF DESCRIPTION OF THE DRAWINGS

FIG. 3 is a schematic flowchart of a method for selecting an initial BWP according to an embodiment of the present disclosure FIGS. 4 to 8 are examples of a method for selecting an initial BWP according to embodiments of the present disclosure.

FIG. 9 is a schematic flowchart of another method of reselecting an initial BWP according to an embodiment of the present disclosure.

FIG. 10 is a schematic block diagram of a terminal device according to an embodiment of the present disclosure.

FIG. 11 is a schematic block diagram of a network device according to an embodiment of the present disclosure.

DETAILED DESCRIPTION

Figure 1:
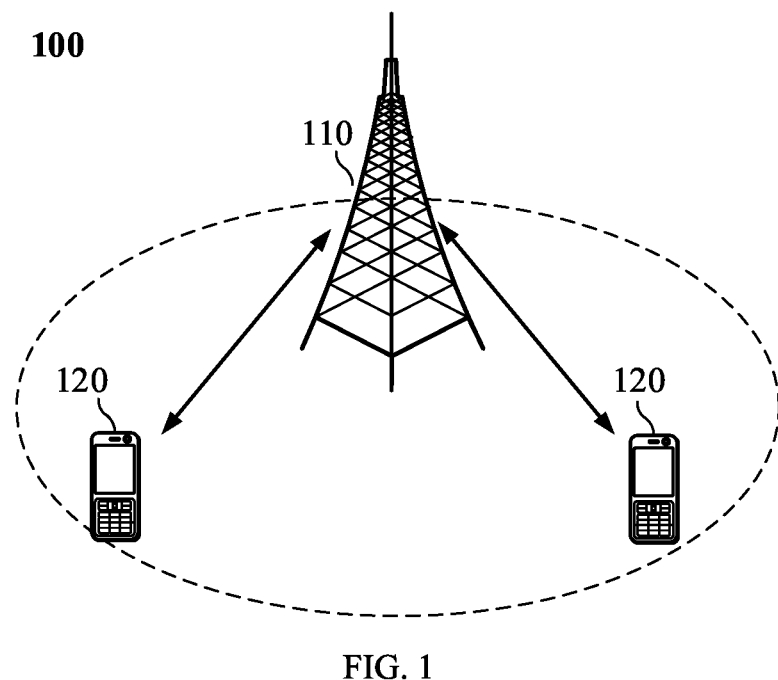
FIG. 1 is a schematic diagram of a communication system architecture according to embodiments of the present disclosure.

The technical solutions in embodiments of the present disclosure will be described below with reference to the drawings in the embodiments of the present disclosure. Obviously, the described embodiments are part of the embodiments of the present disclosure, but not all of the embodiments. All other embodiments obtained by those of ordinary skill in the art based on the embodiments of described herein without creative work fall within the scope of protection of the present disclosure.

Technical solutions according to embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), Vehicle to Vehicle (V2V) communications, or Vehicle to everything (V2X), etc. Embodiments of the present disclosure can be applied to these communications systems.

Optionally, the communication systems in embodiments of the present disclosure can be applied to a Carrier Aggregation (CA) scenario, can also be applied to a Dual Connectivity (DC) scenario, and can also be applied to a standalone (SA) network deployment scenario.

Optionally, the communication system in embodiments of the present disclosure can be applied in unlicensed spectrum. The unlicensed spectrum may also be considered as shared spectrum. Or, the communication system in embodiments of the present disclosure can also be applied in licensed spectrum. The licensed spectrum may also be considered as non-shared spectrum.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device may be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

In embodiments of the present disclosure, the terminal device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB,), or a relay station or an access point, or a vehicle-mounted device, a wearable device, a network device (gNB) in an NR network, or a network device in future evolved PLMN network or a network device in a NTN network.

By way of example and not limitation, in embodiments of the present disclosure, the network device may have mobile characteristics, for example, the network device may be a mobile device. Optionally, the network device may be a satellite, a or balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

As an example, the altitude range of LEO is 500 km~1500 km, and the corresponding orbital period is about 1.5 hours~2 hours. The signal propagation delay of single-hop communication between a UE and a satellite is generally less than 20 ms. The maximum satellite visibility time is 20 minutes. The signal propagation distance is short, the link loss is low, and the transmitting power requirement for the user terminal is not high.

As an example, the orbit altitude of GEO is 35786 km and the rotation period around the earth is 24 hours. The signal propagation delay of single-hop communication between a UE and a satellite is generally 250 ms.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

Exemplarily, a communication system 100 to which embodiments of the present disclosure may be applied is shown in FIG. 1. The communication system 100 may include a network device 110. The network device 110 may be a device that communicates with a terminal device 120 (or referred to as a communication terminal, or a terminal). The network device 110 may provide communication coverage for a particular geographic area and may communicate with terminal devices within the coverage area.

FIG. 1 exemplarily shows one network device and two terminal devices. According to some embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller, or a mobility management entity, which are not limited in embodiments of the present disclosure.

It should be understood that a device having a communication function in the network/system in embodiments of the present disclosure may be referred to as a communication device. Taking the communication system 100 shown in FIG. 1 as an example, the communication device may include a network device 110 and terminal devices 120 with a communication function, and the network device 110 and the terminal devices 120 may be the specific devices described above, which will not be repeated here. The communication device may further include other devices in the communication system 100, such as other network entities like a network controller or a mobility management entity, which are not limited in embodiments of the present disclosure.

It should be understood that the terms "system" and "network" are often used interchangeably herein. The term "and/or" herein is only an association relationship to describe associated objects, indicating that there can be three kinds of relationships, for example, A and/or B can mean three cases: A alone, B alone, and A and B together. In addition, the character "/" herein generally indicates that the related objects are an "or" relationship.

It is to be understood that "indication/indicate" referred to in embodiments of the present disclosure may be a direct indication, an indirect indication, or representing an association relationship. For example, A indicates B can mean that A indicates B directly, for example, B may be obtained through A; or A indicates B can mean that A indicates B indirectly, for example, A indicates C and B may be obtained through C; or, A indicates B can mean that A and B have an association relationship.

In the description of embodiments of the present disclosure, the term "correspond/corresponding" may indicate a direct correspondence or indirect correspondence between two objects, or may indicate an association relationship between the two objects, or may be a relationship of indicating and being indicated, configuring and being configured, etc.

It should be understood that in embodiments of the present disclosure, NR may also be deployed independently. A new Radio Resource Control (RRC) state, RRC_INACTIVE state, is defined in the 5G network environment for the purpose of reducing air interface signaling and quickly restoring wireless connectivity and data services. This state is different from the RRC_IDLE (idle) state and RRC_CONNECTED state.

In the RRC_IDLE state: mobility is based on cell selection reselection of a terminal device, paging is initiated by the Core Network (CN), and the paging area is configured by the CN. There is no Access Stratum (AS) context for the terminal device on the base station side, and no RRC connection exists.

In the RRC_CONNECTED state: RRC connection exists, and AS context for the terminal device exists at the base station and the terminal device. The network device knows the location of the terminal device in a cell-specific level. Mobility is mobility controlled by the network device. Unicast data may be transmitted between the end device and the base station.

In the RRC_INACTIVE state: mobility is based on cell selection reselection of a terminal device, connection between CN-NR exists, AS context for the terminal device exists on a certain base station, paging is triggered by Radio Access Network (RAN), a RAN based paging area is managed by RAN, and the network device knows the location of terminal device in a RAN based paging area level.

It should be noted that in embodiments of the present disclosure, the inactive state may also be called a deactivated state, which is not limited in the present disclosure.

The maximum channel bandwidth supported in the NR system may be up to 400 MHZ (wideband carrier). If a UE keeps working on the wideband carrier, the power consumption of the UE is very large. Adjusting the UE's Radio Frequency (RF) bandwidth according to the actual UE throughput can optimize the UE's power consumption, which is the motivation for introducing the Bandwidth Part (BWP).

For a terminal device in the RRC_CONNECTED state, there may be at most one active downlink BWP and one active uplink BWP at a time. The network device may configure up to four uplink BWPs and up to four downlink BWPs for a terminal in the RRC_CONNECTED state. For a Frequency Division Duplexing (FDD) system, there is no explicit association between the uplink BWPs and the downlink BWPs. For example, a network device may configure a terminal in the RRC_CONNECTED state with four uplink BWPs (uplink BWP indexes are 0, 1, 2, 3, respectively) and four downlink BWPs (downlink BWP indexes are 0, 1, 2, 3, respectively). The currently active UL BWP index may be 0 and the currently active DL BWP index may be 1. If Downlink Control Information (DCI) is used to indicate to switch the downlink BWP to another BWP, for example from the currently active DL BWP 1 to DL BWP 2, the UL BWP may remain unchanged.

Terminal devices in the RRC_IDLE state and the RRC_INACTIVE state may obtain the Master Information Block (MIB) and System Information Block (SIB)1 information of a cell which the terminal devices camp on through the cell defining Synchronization Signal Block (CD-SSB). SIB1 indicates information related to configuration of an initial BWP used for initial access, and contains, for example, information related to configuration of an initial UL BWP and an initial DL BWP. In the information related to configuration of the initial UL BWP, the network configures random access resources (e.g., RACH-ConfigCommon) for a terminal device to perform initial access, and a correspondence between the random access resources and Synchronization Signal Blocks (SSBs). The network device may also control the selection of random access resource for the terminal device by configuring a Reference Signal Receiving Power (RSRP) threshold (e.g., rsrp-ThresholdSSB). When the random access procedure is triggered, the terminal may select a SSB whose RSRP measurement value satisfies the above RSRP threshold, and further select a corresponding random access resource according to the correspondence between random access resources and SSBs to send a random access preamble (i.e., Msg1), and monitor a random access response message (i.e., Msg2) sent by the network on the selected SSB.

In the NTN system, in order to ensure the satellite coverage and enhance the system capacity of the whole satellite communication system, satellites use multiple beams to cover the ground. One satellite may form dozens or even hundreds of beams to cover the ground, and one satellite beam may cover a ground area of tens to hundreds of kilometers in diameter.

Satellite beams are the smallest unit of satellite coverage of the Earth's surface, corresponding to different directions. Typically, one satellite provides coverage of the Earth's surface through hundreds or thousands of satellite beams. These satellite beams may be deployed as different cells or within the same cell.

Figure 2:
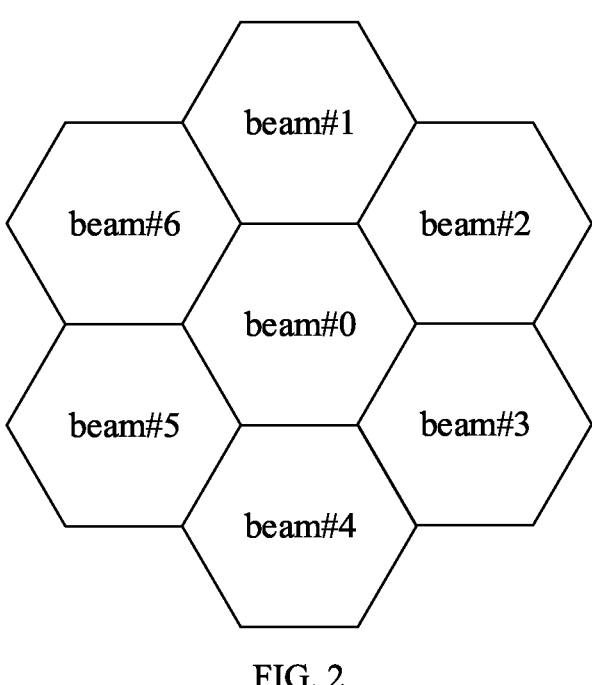
FIG. 2 is a diagram of a beam distribution in an NTN system according to an embodiment of the present disclosure.

In order to minimize co-channel interference between different satellite beams, a network deployment may use different frequency points/carriers/bands for adjacent satellite beams, as shown in FIG. 2. One implementation is to configure different BWPs within the same cell for different satellite beams, so that a terminal device does not need to perform cell handover when moving between satellite beams, and only needs to perform BWP switching within the cell. In this case, how to select an initial BWP for a UE in a non-connected state is an urgent problem.

FIG. 3 is a schematic flowchart of a method 200 for selecting an initial BWP according to an embodiment of the present disclosure. The method 200 may be performed by a terminal device in the communication system shown in FIG. 1, and as shown in FIG. 3, the method 200 may include at least part of the following.

In S210, the terminal device determines a target initial BWP among a plurality of initial BWPs for a first cell according to measurement results of a plurality of reference signal beams in the first cell. Each initial BWP in the plurality of initial BWPs is associated with at least one reference signal beam. The first cell is a cell which the terminal device currently camps on.

It should be understood that the embodiment of the present disclosure may be applied to a NTN scenario or may also be applied to a non-NTN scenario where a plurality of initial BWPs are configured and it is needed to select an initial BWP, and embodiments of the present disclosure do not impose specific limitations on this.

In embodiments of the present disclosure, different initial BWPs in the plurality of initial BWPs do not overlap with each other in the frequency domain.

Optionally, in embodiments of the present disclosure, the first cell may have a plurality of reference signal beams. The reference signal beams are beams realized by reference signal transmission, and in a sense, it may be considered that the reference signals exist in a beam form. Thus, the measurement results of the reference signal beams may be understood as the measurement results of the reference signals.

Optionally, in some embodiments, the reference signal beams are used to transmit at least one of the following reference signals:

a Synchronization Signal Block (SSB) beam;

a Channel State Information Reference Signal (CSI-RS); and a Demodulation Reference Signal (DMRS).

Optionally, the SSB may include, for example, a Primary Synchronization Signal (PSS) and a Secondary Synchronization Signal (SSS), etc.

Optionally, the DMRS may include, for example, a DMRS for demodulating a Physical Downlink Shared Channel (PDSCH), a Physical Downlink Control Channel (PDCCH), and a Physical Broadcast Channel (PBCH).

Hereinafter, description will be made with the reference signal beams being SSB beams as an example, but the present disclosure is not limited to this.

Optionally, in embodiments of the present disclosure, each of the plurality of initial BWPs may be associated with one or more SSB beams.

Optionally, in the NTN scenario, the first cell may have a plurality of satellite beams, and each of the plurality of satellite beams may be associated with a set of SSB beams. The set of SSB beams may include one or more SSB beams. Each satellite beam may be associated with one initial BWP, and different satellite beams are associated with different initial BWPs.

In some embodiments, the network device may send initial BWP selection configuration information to the terminal device. The initial BWP selection configuration information is used to configure the plurality of initial BWPs. For example, the initial BWP selection configuration information may include identity information of the plurality of initial BWPs, such as BWP indexes or BWP IDs.

Optionally, in some embodiments, the initial BWP selection configuration information may include a first association relationship. The first association relationship is an association relationship between initial BWPs and SSB beams, in which each initial BWP is associated with one or more SSB beams. The identity information of the SSB beams may be, such as SSB indexes or SSB IDs.

Optionally, the first association relationship may be an association relationship between initial BWP indexes and SSB indexes, Alternatively, the first association relationship may be expressed in other ways, which are not limited in embodiments of the present disclosure.

It should be understood that in the first association relationship, multiple SSB beams associated with the same initial BWP may be associated with the same satellite beam or may be associated with different satellite beams, which are not limited in embodiments of the present disclosure.

Optionally, in some embodiments, the initial BWP selection configuration information may include a second association relationship. The second association relationship is an association relationship between initial BWPs and an SSB beams, in which each initial BWP is associated with a set of SSB beams, and the set of SSB beams are associated with the same satellite beam.

Optionally, the second association relationship may be an association relationship between initial BWP indexes and the SSB indexes. Alternatively, the second association relationship may be expressed in other ways, which are not limited in embodiments of the present disclosure.

Optionally, in some embodiments, the initial BWP selection configuration information may include a third association relationship. The third association relationship is an association relationship between initial BWPs and the satellite beams, in which each initial BWP is associated with one satellite beam. The identity information of the satellite beam may be, such as a beam index or beam ID.

Optionally, the third association relationship may be an association relationship between initial BWP indexes and the beam indexes. Alternatively, the third association relationship may be expressed in other ways, which are not limited in embodiments of the present disclosure.

Optionally, in some other embodiments, one initial BWP may be associated with multiple satellite beams, as long as one initial BWP can be indexed by one satellite beam, and embodiments of the present disclosure do not impose specific limitations on this.

Optionally, in some embodiments, the initial BWP selection configuration information is further used to configure other parameters for initial BWP selection, for example, the initial BWP selection configuration information is further used to configure at least one of the following parameters:

a first signal quality threshold which represents a minimum quality threshold to be met as a target reference signal;

a second signal quality threshold which represents a minimum quality threshold to be met by a reference signal beam used to determine a measurement result of a satellite beam;

a third signal quality threshold which represents a minimum quality threshold to be met by a reference signal beam used to determine a measurement result of an initial BWP;

a first signal number threshold which represents a maximum number of reference signal beams used to determine a measurement result of a satellite beam;

a second signal number threshold which represents a maximum number of reference signal beams used to determine a measurement result of an initial BWP;

a first beam quality threshold which represents a minimum quality threshold to be met as a target satellite beam; and a first BWP quality threshold which represents a minimum quality threshold to be met as a target initial BWP.

In some embodiments, the initial BWP selection configuration information may be configured via a broadcast message. For example, the initial BWP configuration information may be carried in System Information Block (SIB) 1. Or, the initial BWP selection configuration information may be configured via other messages or signaling, for example via Radio Resource Control (RRC) signaling, etc, and embodiments of the present disclosure do not impose specific limitations on this.

In some other embodiments, the initial BWP selection configuration information may also be pre-configured, or the network device may not configure the parameters for the terminal device, and the terminal device may make initial BWP selection based on other rules, and embodiments of the present disclosure do not impose specific limitations on this.

Optionally, the measurement result in embodiments of the present disclosure may be, for example, but not limited to, at least one of the following:

Received Signal Strength Indication (RSSI);

Reference Signal Receiving Power (RSRP);

Reference Signal Receiving Quality (RSRQ); and

Signal to Interference plus Noise Ratio (SINR).

It should be understood that in the embodiments of the present disclosure, when making a channel quality comparison, the comparison can be made directly based on the measurement result, or the measurement result may be converted into other relevant parameter and then comparison is made, and embodiments of the present disclosure do not impose specific limitations on this. It is understood that the larger the measurement result, the higher the channel quality; and the smaller the measurement result, the worse the channel quality.

Optionally, in embodiments of the present disclosure, the signal quality threshold or beam quality threshold may be a threshold related to the measurement result. For example, when the measurement result is RSRP, the signal quality threshold may be a RSRP threshold and the beam quality threshold may be a RSRP threshold; or, when the measurement result is RSRQ, the signal quality threshold may be a RSRQ threshold and the beam quality threshold may be a RSRQ threshold.

In some embodiments of the present disclosure, the terminal device may select a target initial BWP directly based on the measurement results of a plurality of SSB beams in the first cell.

For example, the terminal device may first determine a target SSB beam among the plurality of SSB beams according to the measurement results of the plurality of SSB beams, and further determines an initial BWP associated with the target SSB beam as the target initial BWP in conjunction with the association relationship between the target SSB beam and the initial BWP.

For example, a SSB beam with the best channel quality among the plurality of SSB beams may be determined as the target SSB beam.

As another example, a SSB beam with the best channel quality (or in other words, the best measurement result, or the highest measurement result) among the plurality of SSB beams over a period of time may be determined as the target SSB beam.

As a further example, a SSB beam having a channel quality higher than a first signal quality threshold (e.g., a measurement result greater than the first signal quality threshold) among the plurality of SSB beams may be determined as the target SSB beam.

In some other embodiments of the present disclosure, the terminal device may determine a measurement result of each satellite beam of the plurality of satellite beams in the first cell according to the measurement results of the plurality of SSB beams in the first cell, and select the target initial BWP among the plurality of initial BWPs further in conjunction with the measurement results of the plurality of satellite beams.

For example, the terminal device may determine a target satellite beam among the plurality of satellite beams according to the measurement results of the plurality of satellite beams, and further determine an initial BWP associated with the target satellite beam as the target initial BWP in conjunction with the association relationship between the target satellite beam and the initial BWP.

For example, a satellite beam with the best channel quality among the plurality of satellite beams may be determined as the target satellite beam.

As another example, a satellite beam with the best channel quality (or in other words, the best measurement result, or the highest measurement result) among the plurality of satellite beams over a period of time may be determined as the target satellite beam.

As a further example, a satellite beam having a channel quality higher than a first beam quality threshold (e.g., a measurement result greater than the first beam quality threshold) among the plurality of satellite beams may be determined as the target satellite beam.

Optionally, in some embodiments, the measurement result of each satellite beam may be determined based on the measurement results of a set of SSB beams associated with each satellite beam.

As an embodiment, the terminal device may select at least one target measurement result among a set of measurement results of a set of SSB beams associated with the each satellite beam according to a second signal quality threshold and/or a first signal number threshold, further determine the measurement result of the each satellite beam according to the at least one target measurement result.

The second signal quality threshold is used to control the minimum quality threshold to be met by a SSB beam involved in calculating the measurement result of a satellite beam. The first signal number threshold is used to control the maximum number of SSB beams involved in calculating the measurement result of a satellite beam. That is, in some cases, not all measurement results of the SSB beams associated with a satellite beam are involved in the calculation of the measurement result of that satellite beam.

As an example, if the second signal quality threshold is not configured, the terminal device may determine the largest (or in other words, the highest) measurement result among the set of measurement results as the measurement result of the satellite beam.

As yet another example, if the first SSB number threshold is not configured, the terminal device may determine the largest measurement result among the set of measurement results as the measurement result of the satellite beam.

As a further example, if the largest measurement result among the set of measurement results is less than or equal to the second channel quality threshold, i.e., the set of measurement results are all less than or equal to the second channel quality threshold, the terminal device may determine the largest measurement result among the set of measurement results as the measurement result of the satellite beam.

As a further example, if the first SSB number threshold is not configured, but the second channel quality threshold is configured, and there exists a measurement result greater than the second signal quality threshold among the set of measurement results, the terminal device may determine the largest measurement result among the set of measurement results as the measurement result of the satellite beam. Or, if there are multiple measurement results greater than the second signal quality threshold, the terminal device may determine the measurement result of the satellite beam according to all the measurement results greater than the second signal quality threshold. For example, the terminal device may determine a linear average value of all measurement results greater than the second signal quality threshold as the measurement result of the satellite beam.

As a further example, if the first SSB number threshold and the second signal quality threshold are configured and there exist measurement results greater than the second signal quality threshold among the set of measurement results, the terminal device may determine highest measurement results, number of which does not exceed the first SSB number threshold, among measurement results of SSB beams higher than the second signal quality threshold as the measurement result of the satellite beam.

For example, if the first SSB number threshold is 5 and there are 3 measurement results that meet the second signal quality threshold, the terminal device may determine the measurement result of the satellite beam according to the 3 measurement results. For example, the terminal device may determine the linear average value of the 3 measurement results as the measurement result of the satellite beam.

For example, if the first SSB number threshold is 5 and there are 7 measurement results that meet the second signal quality threshold, the terminal device may determine the measurement result of the satellite beam according to 5 measurement results that have the best channel quality among the 7 measurement results. For example, the terminal device may determine the linear average value of the 5 measurement results as the measurement result of the satellite beam.

The above-mentioned methods of determining the measurement result of the satellite beam are only examples, and in practice, the methods may be adjusted on actual situations, and embodiments of the present disclosure are not limited to this.

In some other embodiments of the present disclosure, the terminal device may determine a measurement result of each initial BWP of the plurality of initial BWPs in the first cell according to the measurement results of the plurality of SSB beams in the first cell, and select the target initial BWP among the plurality of initial BWPs further in conjunction with the measurement results of the plurality of initial BWPs.

For example, an initial BWP with the best channel quality among the plurality of initial BWPs may be determined as the target initial BWP.

As another example, an initial BWP with the best channel quality (or in other words, the best measurement result, or the highest measurement result) among the plurality of initial BWPs over a period of time may be determined as the target initial BWP.

As a further example, an initial BWP having a channel quality higher than a first BWP quality threshold (e.g., a measurement result greater than the first BWP quality threshold) among the plurality of initial BWPs may be determined as the target initial BWP.

Optionally, in some embodiments, the measurement result of each initial BWP may be determined based on the measurement result of at least one SSB beam associated with each initial BWP.

As an embodiment, the terminal device may select at least one target measurement result among at least one measurement result of at least one SSB beam associated with the each initial BWP according to a third signal quality threshold and/or a second signal number threshold, and further determine the measurement result of the each initial BWP according to the at least one target measurement result.

The third signal quality threshold is used to control the minimum quality threshold to be met by a SSB beam involved in calculating the measurement result of an initial BWP. The second signal number threshold is used to control the maximum number of SSB beams involved in calculating the measurement result of an initial BWP. That is, in some cases, not all measurement results of the SSB beams associated with an initial BWP are involved in the calculation of the measurement result of that initial BWP.

As an example, if the third signal quality threshold is not configured, the terminal device may determine the largest (or in other words, the highest) measurement result among the at least one measurement result as the measurement result of the initial BWP.

As yet another example, if the second SSB number threshold is not configured, the terminal device may determine the largest measurement result among the at least one measurement result as the measurement result of the initial BWP.

As a further example, if the largest measurement result among the at least one measurement result is less than or equal to the third channel quality threshold, i.e., the at least one measurement result is all less than or equal to the third channel quality threshold, the terminal device may determine the largest measurement result among the at least one measurement result as the measurement result of the initial BWP.

As a further example, if the second SSB number threshold is not configured, but the third channel quality threshold is configured, and there exists a measurement result greater than the third signal quality threshold among the at least one measurement result, the terminal device may determine the largest measurement result among the at least one measurement result as the measurement result of the initial BWP. Or, if there are multiple measurement results greater than the third signal quality threshold, the terminal device may determine the measurement result of the initial BWP according to all the measurement results greater than the third signal quality threshold. For example, the terminal device may determine a linear average value of all measurement results greater than the third signal quality threshold as the measurement result of the satellite initial BWP.

As a further example, if the second SSB number threshold and the third signal quality threshold are configured and there exist measurement results greater than the third signal quality threshold among the at least one measurement result, the terminal device may determine highest measurement results, number of which does not exceed the second SSB number threshold, among measurement results of SSB beams higher than the third signal quality threshold as the measurement result of the initial BWP.

For example, if the second SSB number threshold is 5 and there are 3 measurement results that meet the third signal quality threshold, the terminal device may determine the measurement result of the initial BWP according to the 3 measurement results. For example, the terminal device may determine the linear average value of the 3 measurement results as the measurement result of the initial BWP.

For example, if the second SSB number threshold is 5 and there are 7 measurement results that meet the third signal quality threshold, the terminal device may determine the measurement result of the initial BWP according to 5 measurement results that have the best channel quality among the 7 measurement results. For example, the terminal device may determine the linear average value of the 5 measurement results as the measurement result of the initial BWP.

The above-mentioned methods of determining the measurement result of the initial BWP are only examples, and in practice, the methods may be adjusted on actual situations, and embodiments of the present disclosure are not limited to this.

Optionally, in embodiments of the present disclosure, different initial BWPs do not overlap each other in the frequency domain.

In some embodiments, the plurality of initial BWPs include a plurality of uplink initial BWPs and a plurality of downlink initial BWPs. The plurality of uplink initial BWPs and the plurality of downlink initial BWPs have a correspondence relationship, for example, they are in a one-to-one correspondence, i.e., each uplink initial BWP corresponds to one downlink initial BWP.

In some embodiments, the network device may send to the terminal device a configuration of the plurality of downlink initial BWPs and the plurality of uplink initial BWPs, and/or a correspondence between the plurality of downlink initial BWPs and the plurality of uplink initial BWPs. For example, configuration may be performed via a broadcast message, or by other messages or signaling, such as by RRC signaling, etc., and embodiments of the present disclosure do not impose specific limitations on this.

In some embodiments, an uplink initial BWP and a downlink initial BWP having a correspondence with each other use the same BWP identity (ID, or index), or in other words, the uplink initial BWP and the downlink initial BWP may be associated together by the same BWP identity.

An uplink initial BWP and a downlink initial BWP having a correspondence with each other may be referred to as a pair of initial BWPs. Thus, the selection of an initial BWP in embodiments of the present disclosure may include the selection of an uplink initial BWP and/or the selection of a downlink initial BWP. Since there is a correspondence between the uplink initial BWP and the downlink initial BWP, when making the initial BWP selection, if the initial BWP in one of the directions is determined, an initial BWP in the other direction may be determined according to the correspondence. For example, when a target downlink initial BWP is determined among a plurality of downlink initial BWPs, the uplink initial BWP corresponding to the target downlink initial BWP may be determined as the target uplink initial BWP. Further, in uplink and downlink communications, the corresponding target initial BWPs may be used for communications.

Hereinafter, the method of initial BWP selection according to embodiments of the present disclosure will be described in conjunction with FIGS. 4 to 8.

Embodiment 1

The initial BWP selection may include at least part of the following steps:

In S201, a UE receives a system message from a network device, such as SIB1. The system message may include configuration information related to the initial BWP selection, including for example at least one of the following information:

(a) a plurality of initial BWPs, where each initial BWP is associated with one satellite beam;

(b) for each initial BWP, one or more SSB indexes associated with the initial BWP are indicated in SIB1, and each SSB index is associated with only one satellite beam.

In S202, the UE performs measurements of the SSB beams, and selects a SSB index with the best channel quality among the plurality of SSB beams in the serving cell of the terminal device. Then, according to the association between initial BWPs and SSB beams indicated via the system message, the UE determines one initial BWP associated with the SSB index as the target initial BWP.

In S203, the UE performs subsequent communications on the target initial BWP, such as monitoring paging messages, initiating initial random access, etc.

As shown in FIG. 4, the UE's serving cell is configured with three initial BWPs, i.e., initial BWP1, initial BWP2, and initial BWP3, where initial BWP1 is associated with SSB beam 1, SSB beam 2, and SSB beam 3; initial BWP2 is associated with SSB beam 4, SSB beam 5, and SSB beam 6; and initial BWP3 is associated with SSB beam 7, SSB beam 8 and SSB beam 9.

In Embodiment 1, the UE may determine that the SSB beam with the best channel quality is SSB beam 4 according to the measurement results of the nine SSB beams, and SSB beam 4 is associated with initial BWP2, and initial BWP2 may be selected as the target initial BWP.

Embodiment 2

The initial BWP selection may include at least part of the following steps:

In S301, a UE receives a system message from a network device, such as SIB1. The system message may include configuration information related to the initial BWP selection, including for example at least one of the following information:

(a) a plurality of initial BWPs, where each initial BWP is associated with a satellite beam;

(b) for each initial BWP, a set of SSB indexes associated with the initial BWP are indicated in S1B1, and the set of SSB indexes are associated with only one satellite beam.

In S302, the UE performs measurements of the SSB beams, and determines the measurements of the plurality of satellite beams according to the measurement of the plurality of SSB beams in the serving cell. For the specific manner of determination, reference may be made to the previous relevant description and repeated description will be omitted here.

Further, the UE may select a satellite beam with the best channel quality, or select a satellite beam with a channel quality greater than the first beam quality threshold. Then, according to the association relationship between initial BWPs and satellite beams indicated via the system message, the UE determines an initial BWP associated with the satellite beam as the target initial BWP.

In S303, the UE performs subsequent communications on the target initial BWP, such as monitoring paging messages, initiating initial random access, etc.

Figure 5:
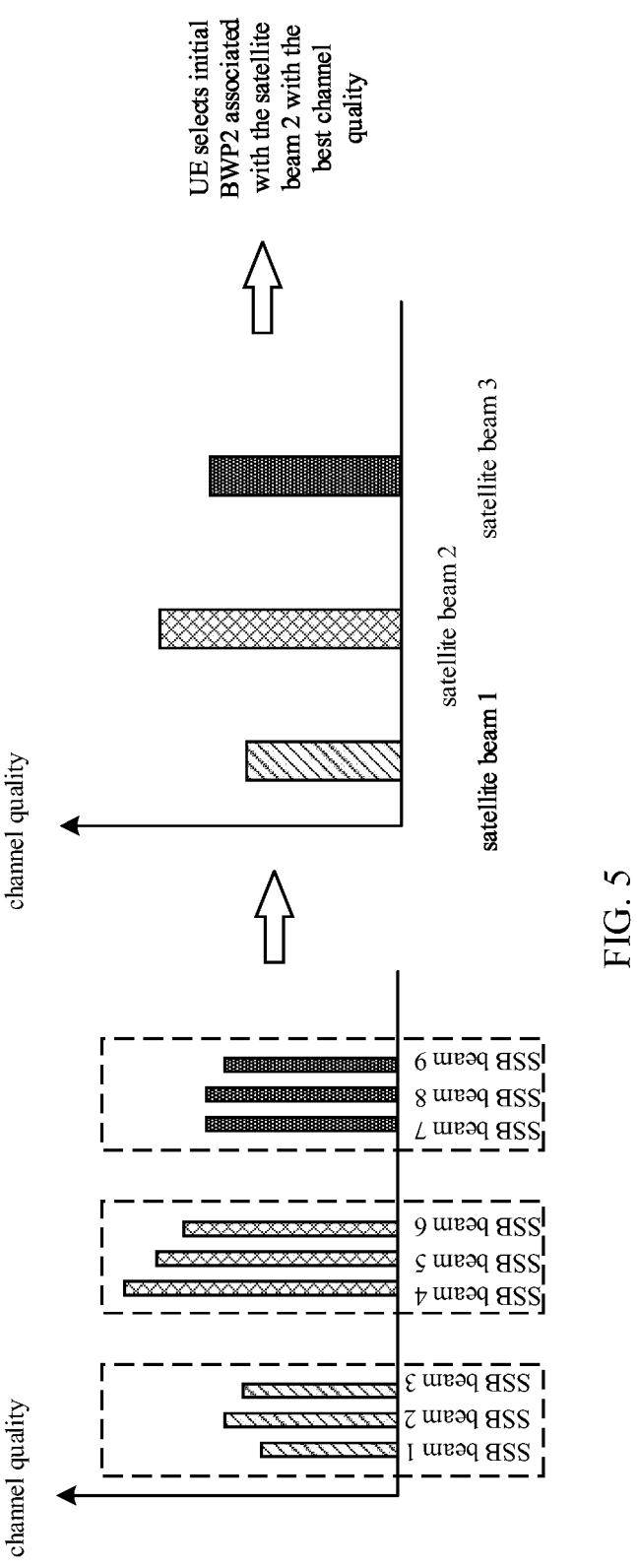

As shown in FIG. 5, the UE's serving cell is configured with three initial BWPs, i.e., initial BWP1, initial BWP2, and initial BWP3. Initial BWP1 is associated with SSB beam 1, SSB beam 2 and SSB is 3, and, the three SSB beams are associated with satellite beam 1. Initial BWP2 is associated with SSB beam 4, SSB beam 5 and SSB beam 6, and the three SSB beams are associated with satellite beam 2. Initial BWP3 is associated with SSB beam 7, SSB beam 8 and SSB beam 9, and the three SSB beams are associated with satellite beam 3.

Further, the UE may determine the measurement result of each satellite beam according to the measurement results of the SSB beams associated with each satellite beam, and then determine a satellite beam with the best channel quality among the three satellite beams as the target satellite beam. As shown in FIG. 5, the satellite beam 2 has the best channel quality, and the UE may select the initial BWP2 associated with the satellite beam 2 as the target initial BWP.

Figure 6:
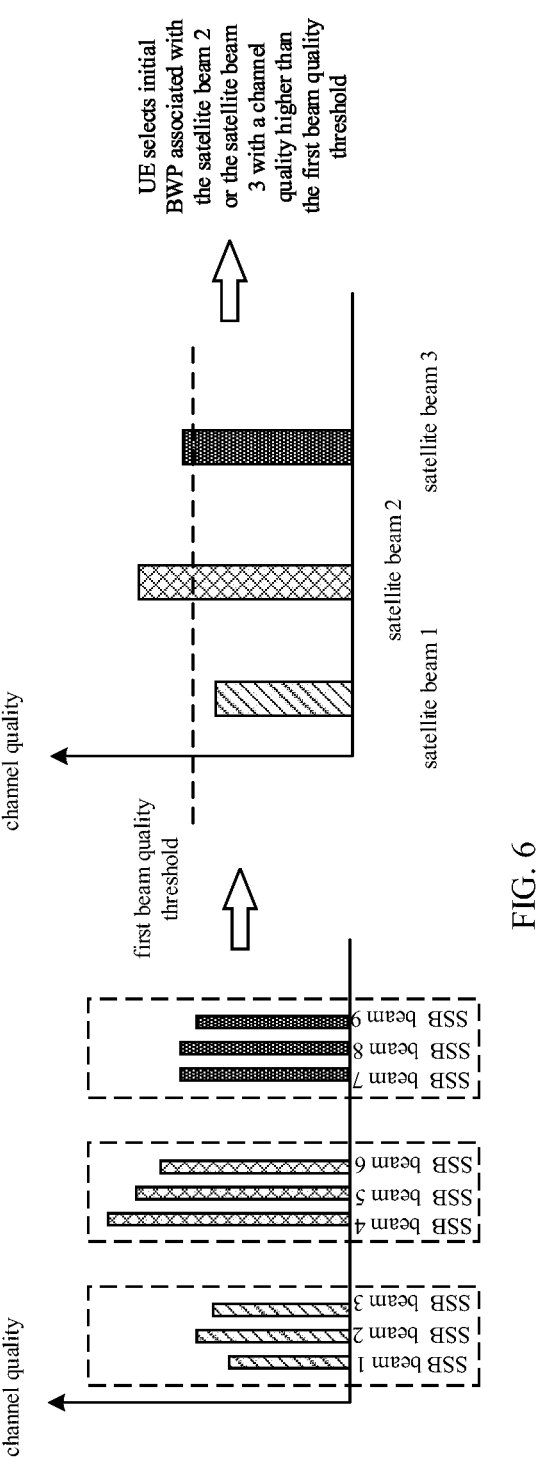

As shown in FIG. 6, the serving cell of said UE is configured with three initial BWPs, i.e., initial BWP1, initial BWP2 and initial BWP3. Initial BWP1 is associated with SSB beam 1, SSB beam 2 and SSB beam 3, and the three SSB beams are associated with satellite beam 1. Initial BWP2 is associated with SSB beam 4, SSB beam 5 and SSB beam 6, and the three SSB beams are associated with satellite beam 2. Initial BWP3 is associated with SSB beam 7, SSB beam 8 and SSB beam 9, and the three SSB beams are associated with satellite beam 3.

Further, the UE may determine the measurement result of each satellite beam according to the measurement results of the SSB beams associated with each satellite beam, and then determine a satellite beam with a channel quality greater than the first beam quality threshold among the three satellite beams. As shown in FIG. 6, the satellite beams that satisfy the condition are satellite beam 2 and satellite beam 3. Then, the UE may select the initial BWP associated with the satellite beam 2 or satellite beam 3 as the target initial BWP.

Embodiment 3

The initial BWP selection may include at least part of the following steps:

In S401, a UE receives a system message from a network device, e.g., SIB1. The system message may include configuration information related to the initial BWP selection, including for example at least one of the following information:

(a) a plurality of initial BWPs;

(b) for each initial BWP, a set of SSB indexes associated with the initial BWP are indicated in SIB1.

In S402, the UE performs measurements of the SSB beams and determines the measurement results of the plurality of initial BWPs according to the measurement results of the plurality of SSB beams in the serving cell. For the specific determination, reference may be made to the previous relevant description and repeated description will be omitted here.

Further, the UE may select an initial BWP with the best channel quality, or select an initial BWP with a channel quality greater than the first BWP quality threshold as the target initial BWP.

In S403, the UE performs subsequent communications on the target initial BWP, such as monitoring paging messages, initiating initial random access, etc.

Figure 7:
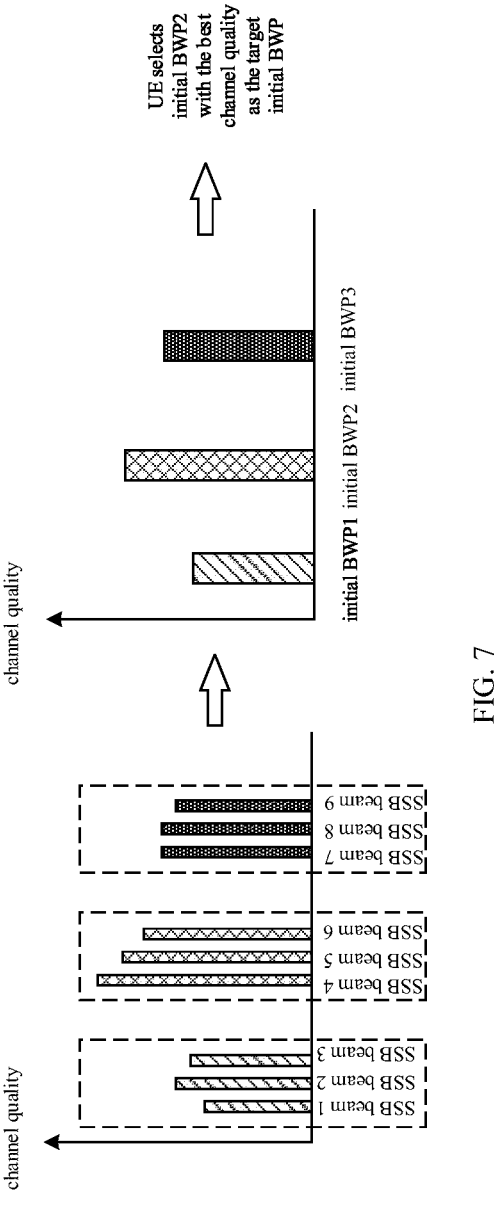

As shown in FIG. 7, the UE's serving cell is configured with three initial BWPs, i.e., initial BWP1, initial BWP2 and initial BWP3. Initial BWP1 is associated with SSB beam 1, SSB beam 2 and SSB beam 3. Initial BWP2 is associated with SSB beam 4, SSB beam 5, and SSB beam 6. Initial BWP3 is associated with SSB beam 7, SSB beam 8, and SSB beam 9.

Further, the UE may determine the measurement result of each initial BWP according to the measurement results of the SSB beams associated with each initial BWP, and then determine the initial BWP with the best channel quality among the three initial BWPs as the target initial BWP. As shown in FIG. 7, the initial BWP2 has the best channel quality, and the UE may select the initial BWP2 as the target initial BWP.

Figure 8:
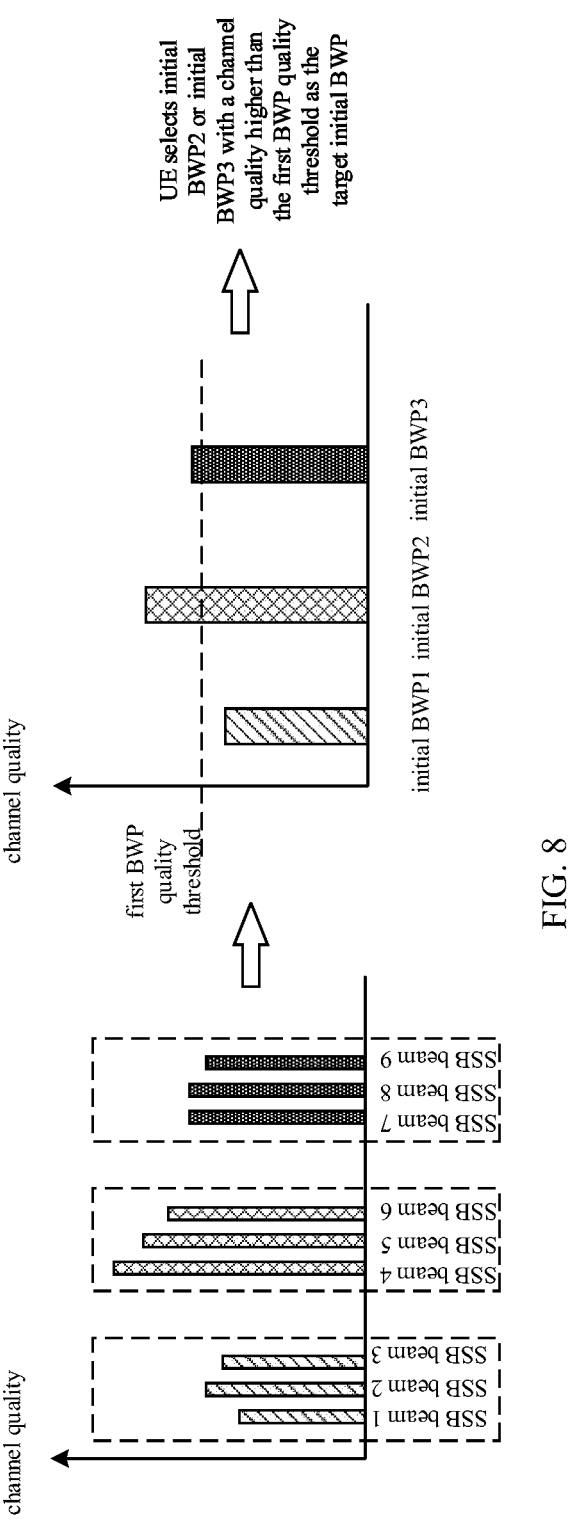

As shown in FIG. 8, the serving cell of the UE is configured with three initial BWPs, i.e., initial BWP1, initial BWP2 and initial BWP3. Initial BWP1 is associated with SSB beam 1, SSB beam 2, and SSB beam 3. Initial BWP2 is associated with SSB beam 4, SSB beam 5, and SSB beam 6. Initial BWP3 is associated with SSB beam 7, SSB beam 8, and SSB beam 9.

Further, the UE may determine the measurement result of each initial BWP according to the measurement results of the SSB beams associated with each initial BWP, and then determine at least one initial BWP having a channel quality greater than the first BWP quality threshold among the three initial BWPs. As shown in FIG. 8, the initial BWPs satisfying the condition are initial BWP2 and initial BWP3, and the UE may select initial BWP2 or initial BWP3 as the target initial BWP.

Thus, in embodiments of the present disclosure, the terminal device can select the target initial BWP among multiple initial BWPs in the cell which the terminal device camps on (or in other words, in the serving cell) according to the measurement results of multiple reference signal beams in the cell, which is conducive to selecting to an initial BWP with a good channel quality, and can thus ensure the communication success rate of the terminal device.

The method for selecting the initial BWP according to embodiments of the present disclosure is described in detail above in conjunction with FIGS. 3 to 8 from the perspective of a terminal device, and the method for selecting the initial BWP according to some other embodiments of the present disclosure will be described in detail below in conjunction with FIG. 9 from the perspective of a network device. It should be understood that the description on the network device side corresponds to the description on the terminal device side, and similar descriptions can be found above and will not be repeated here to avoid repetition.

FIG. 9 is a schematic flowchart of a method for selecting an initial BWP according to another embodiment of the present disclosure. The method 300 may be performed by a network device in the communication system shown in FIG. 1. As shown in FIG. 9, the method 300 may include at least part of the following:

In S310, the network device sends initial BWP selection configuration information to a terminal device. The initial BWP selection configuration information is used for the terminal device to determine a target initial BWP to be selected among a plurality of initial BWPs.

Optionally, in some embodiments, the initial BWP selection configuration information includes at least one of:
    a first association relationship in which each initial BWP is associated with one or more reference signal beams;
    a second association relationship in which each initial BWP is associated with a set of reference signal beams and the set of reference signal beams are associated with a same satellite beam;

a third association relationship in which each initial BWP is associated with one satellite beam;
    a first signal quality threshold which represents a minimum quality threshold to be met as a target reference signal;
    a second signal quality threshold which represents a minimum quality threshold to be met by a reference signal beam used to determine a measurement result of a satellite beam;
    a third signal quality threshold which represents a minimum quality threshold to be met by a reference signal beam used to determine a measurement result of an initial BWP;
    a first signal number threshold which represents a maximum number of reference signal beams used to determine a measurement result of a satellite beam;
    a second signal number threshold which represents a maximum number of reference signal beams used to determine a measurement result of an initial BWP;
    a first beam quality threshold which represents a minimum quality threshold to be met as a target satellite beam; and
    a first BWP quality threshold which represents a minimum quality threshold to be met as a target initial BWP.

Optionally, in some embodiments, the initial BWP selection configuration information is configured via a broadcast message or Radio Resource Control (RRC) signaling.

The method embodiments of the present disclosure are described in detail above in connection with FIGS. 3 to 9, and device embodiments of the present disclosure will be described in detail below in connection with FIGS. 10 to 14. It should be understood that the device embodiments and the method embodiments correspond to each other, and similar descriptions can be referred to the method embodiments.

FIG. 10 is a schematic block diagram of a terminal device 400 according to an embodiment of the present disclosure. As shown in FIG. 10, the terminal device 400 includes a processing unit 410.

The processing unit 410 is configured to determine a target initial Bandwidth Part (BWP) among a plurality of initial BWPs for a first cell according to measurement results of a plurality of reference signal beams in the first cell, wherein each initial BWP in the plurality of initial BWPs is associated with at least one reference signal beam, and the first cell is a cell which the terminal device currently camps on.

Optionally, in some embodiments, the processing unit 410 is further configured to:
    determine a target reference signal beam among the plurality of reference signal beams according to the measurement results of the plurality of reference signal beams; and
    determine an initial BWP associated with the target measurement signal as the target initial BWP.

Optionally, in some embodiments, the target measurement signal is a reference signal beam with the highest measurement result among the plurality of reference signal beams; or
    the target measurement signal is a reference signal beam with a measurement result greater than a first signal quality threshold among the plurality of reference signal beams.

Optionally, in some embodiments, the terminal device 400 further includes:
    a communication unit configured to receive a first association relationship sent by a network device, wherein in the first association relationship, each initial BWP is associated with one or more reference signal beams.

Optionally, in some embodiments, the processing unit 410 is further configured to:

according to the measurement results of the plurality of reference signal beams, determine a measurement result of each satellite beam of a plurality of satellite beams in the first cell, wherein each satellite beam is associated with a set of reference signal beams and each satellite beam is associated with an initial BWP;

according the measurement result of each satellite beam, determine a target satellite beam among the plurality of satellite beams; and determine an initial BWP associated with the target satellite beam as the target initial BWP.

Optionally, in some embodiments, the processing unit 410 is further configured to:

determine the measurement result of each satellite beam according to measurement results of the set of reference signal beams associated with each satellite beam.

Optionally, in some embodiments, the processing unit 410 is further configured to:

according to a second signal quality threshold and/or a first signal number threshold, select at least one target measurement result among a set of measurement results of the set of reference signal beams associated with each satellite beam; and according to the at least one target measurement result, determine the measurement result of each satellite beam;

wherein the second signal quality threshold represents a minimum quality threshold to be met by a reference signal beam used to determine a measurement result of a satellite beam, and the first signal number threshold represents a maximum number of reference signal beams used to determine the measurement result of the satellite beam.

Optionally, in some embodiments, when the terminal device is not configured with the second signal quality threshold, the at least one target measurement result includes the highest measurement result among the set of measurement results; or when the highest measurement result among the set of measurement results is less than or equal to the second signal quality threshold, the at least one target measurement result includes the highest measurement result among the set of measurement results; or when the terminal device is not configured with the first signal number threshold, the at least one target measurement result includes the highest measurement result among the set of measurement results; or when the terminal device is configured with the second signal quality threshold and the first signal number threshold, the at least one target measurement result includes: highest measurement results, number of which does not exceed the first signal number threshold, among measurement results of reference signal beams with channel qualities higher than the second signal quality threshold in the set of reference signal beams associated with each satellite beam.

Optionally, in some embodiments, the processing unit 410 is further configured to:

determine a linear average value of the at least one target measurement result as the measurement result of each satellite beam.

Optionally, in some embodiments, the second signal quality threshold is configured via system message broadcast or Radio Resource Control (RRC) signaling; and the first signal number threshold is configured via system message broadcast or RRC signaling.

Optionally, in some embodiments, the terminal device 400 further includes:

a communication unit configured to receive a second association relationship sent by a network device, wherein in the second association relationship, each initial BWP is associated with a set of reference signal beams, and the set of reference signal beams are associated with a same satellite beam.

Optionally, in some embodiments, determining, according the measurement result of each satellite beam, a target satellite beam among the plurality of satellite beams includes:

determining a satellite beam with the highest measurement result among the plurality of satellite beams as the target satellite beam; or determining a satellite beam with a measurement result greater than a first beam quality threshold among the plurality of satellite beams as the target satellite beam.

Optionally, in some embodiments, the terminal device 400 further includes:

a communication unit configured to receive a third association relationship sent by a network device, wherein in the third association relationship, each initial BWP is associated with one satellite beam.

Optionally, in some embodiments, the processing unit 410 is further configured to:

according to the measurement results of the plurality of reference signal beams, determining a measurement result of each initial BWP of the plurality of initial BWPs for the first cell; and determine a target initial BWP among the plurality of initial BWPs according to the measurement result of each initial BWP.

Optionally, in some embodiments, the processing unit 410 is further configured to:

determine the measurement result of each initial BWP according to a measurement result of at least one reference signal beam associated with each initial BWP.

Optionally, in some embodiments, the processing unit 410 is further configured to:

according to a third signal quality threshold and/or a second signal number threshold, select at least one target measurement result among at least one measurement result of the at least one reference signal beam associated with each initial BWP; and according to the at least one target measurement result, determine the measurement result of each initial BWP;

wherein the third signal quality threshold represents a minimum quality threshold to be met by a reference signal beam used to determine a measurement result of an initial BWP, and the second signal number threshold represents a maximum number of reference signal beams used to determine the measurement result of the initial BWP.

Optionally, in some embodiments, when the terminal device is not configured with the third signal quality threshold, the at least one target measurement result includes the highest measurement result among the at least one measurement result; or when the highest measurement result among the at least one measurement result is less than or equal to the third signal quality threshold, the at least one target measurement result includes the highest measurement result among the at least one measurement result; or when the terminal device is not configured with the second signal number threshold, the at least one target measurement result includes the highest measurement result among the at least one measurement result; or when the terminal device is configured with the third signal quality threshold and the second signal number threshold, the at least one target measurement result includes: highest measurement results, number of which does not exceed the second signal number threshold, among measurement results of reference signal beams with channel qualities higher than the third signal quality threshold in the at least one reference signal beam associated with each initial BWP.

Optionally, in some embodiments, the processing unit 410 is further configured to:

determine a linear average value of the at least one target measurement result as the measurement result of each initial BWP.

Optionally, in some embodiments, the third signal quality threshold is configured via system message broadcast or Radio Resource Control (RRC) signaling; and the second signal number threshold is configured via system message broadcast or RRC signaling.

Optionally, in some embodiments, determining the target initial BWP among the plurality of initial BWPs according to the measurement result of each initial BWP includes:

determining an initial BWP with the highest measurement result among the plurality of initial BWPs as the target initial BWP; or determining an initial BWP with a measurement result greater than a first BWP quality threshold among the plurality of initial BWPs as the target initial BWP.

Optionally, in some embodiments, the above communication unit may be a communication interface or a transceiver, or an input/output interface of a communication chip or system-on-a-chip. The above processing unit may be one or more processors.

It should be understood that the terminal device 400 according to the embodiments of the present disclosure may correspond to the terminal device in the method embodiments of the present disclosure, and that the above and other operations and/or functions of the individual units in the terminal device 400 are respectively intended to implement the corresponding processes of the terminal device in the method 200 shown in FIG. 3, and repeated description is omitted here for brevity.

FIG. 11 is a schematic block diagram of a network device 500 according to an embodiment of the present disclosure. As shown in FIG. 11, the network device 500 includes a communication unit 510.

The communication unit 510 is configured to send initial Bandwidth Part (BWP) selection configuration information to a terminal device, wherein the initial BWP selection configuration information is used for the terminal device to determine a target initial BWP to be selected among a plurality of initial BWPs.

Optionally, in some embodiments, the initial BWP selection configuration information includes at least one of:

a first association relationship in which each initial BWP is associated with one or more reference signal beams;

a second association relationship in which each initial BWP is associated with a set of reference signal beams and the set of reference signal beams are associated with a same satellite beam;

a third association relationship in which each initial BWP is associated with one satellite beam;

a first signal quality threshold which represents a minimum quality threshold to be met as a target reference signal;

a second signal quality threshold which represents a minimum quality threshold to be met by a reference signal beam used to determine a measurement result of a satellite beam;

a third signal quality threshold which represents a minimum quality threshold to be met by a reference signal beam used to determine a measurement result of an initial BWP;

a first signal number threshold which represents a maximum number of reference signal beams used to determine a measurement result of a satellite beam;

a second signal number threshold which represents a maximum number of reference signal beams used to determine a measurement result of an initial BWP;

a first beam quality threshold which represents a minimum quality threshold to be met as a target satellite beam; and a first BWP quality threshold which represents a minimum quality threshold to be met as a target initial BWP.

Optionally, in some embodiments, the initial BWP selection configuration information is configured via a broadcast message or Radio Resource Control (RRC) signaling.

Optionally, in some embodiments, the above communication unit may be a communication interface or a transceiver, or an input/output interface of a communication chip or system-on-a-chip. The above processing unit may be one or more processors.

It should be understood that the network device 500 according to the embodiments of the present disclosure may correspond to the network device in the method embodiments of the present disclosure, and that the above and other operations and/or functions of the individual units in the network device 500 are respectively intended to implement the corresponding processes of the network device in the method 300 shown in FIG. 9, and repeated description is omitted here for brevity.

Figure 12:
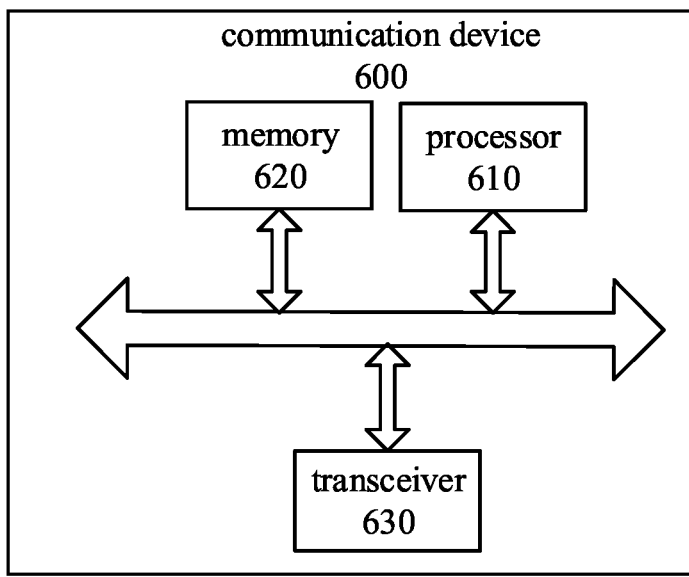
FIG. 12 is a schematic block diagram of a communication device according to an embodiment of the present disclosure.

FIG. 12 is a schematic structural diagram of a communication device 600 according to an embodiment of the present disclosure. The communication device 600 shown in FIG. 12 includes a processor 610, and the processor 610 may call and run a computer program from a memory to perform the method in embodiments of the present disclosure.

According to embodiments, as shown in FIG. 12, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 12, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the network device according to an embodiment of the present disclosure, and the communication device 600 may implement the corresponding processes implemented by the network device in the method embodiments of the present disclosure.

According to embodiments, the communication device 600 may specifically be the mobile terminal/terminal device in embodiments of the present disclosure, and the communication device 600 may implement the corresponding processes implemented by the mobile terminal/terminal device in the method embodiments of the present disclosure. For brevity, details are not repeated here.

Figure 13:
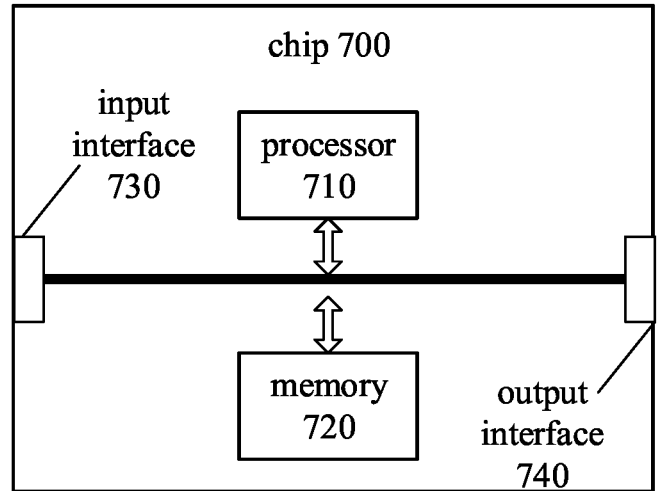
FIG. 13 is a schematic block diagram of a chip according to an embodiment of the present disclosure.

FIG. 13 is a schematic structural diagram of a chip according to an embodiment of the present disclosure. The chip 700 shown in FIG. 13 includes a processor 710, and the processor 710 can call and run a computer program from a memory to implement the method according to embodiments of the present disclosure.

According to embodiments, as shown in FIG. 13, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other devices or chips, and, specifically, the processor 710 can control the input interface to obtain information or data sent by other devices or chips.

According to embodiments, the chip 700 may further include an output interface 740. The processor 710 can control the output interface 740 to communicate with other devices or chips, and, specifically, the processor 710 can control the output interface 740 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the mobile terminal/terminal device in embodiments of the present disclosure, and the chip can implement the corresponding processes implemented by the mobile terminal/terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 14:
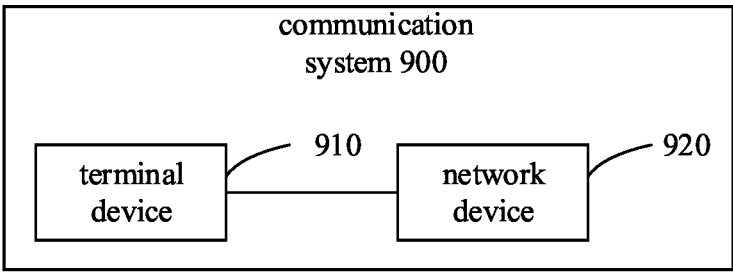
FIG. 14 is a schematic block diagram of a communication system according to an embodiment of the present disclosure.

FIG. 14 is a schematic block diagram of a communication system 900 according to an embodiment of the present disclosure. As shown in FIG. 14, the communication system 900 includes a terminal device 910 and a network device 920.

The terminal device 910 can be used to implement the corresponding functions implemented by the terminal device in the above method embodiments, and the network device 920 can be used to implement the corresponding functions implemented by the network device in the above method embodiments. For brevity, details are not repeated here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for selecting an initial Bandwidth Part (BWP), comprising: receiving, by a terminal device in a non-connected state, initial BWP selection configuration information sent from a network device, wherein the initial BWP selection configuration information is used to configure a plurality of initial BWPs for the terminal device to perform initial access, and the initial BWP selection configuration information comprises an association relationship in which each initial BWP is associated with a set of Synchronization Signal Block (SSB) beams and the set of SSB beams are associated with a same satellite beam, and the initial BWP selection configuration information is carried in System Information Block 1 (SIB1); determining, by the terminal device, a target initial BWP among the plurality of initial BWPs configured by the initial BWP selection configuration information for a first cell according to measurement results of a plurality of SSB beams in the first cell, wherein the first cell is a cell upon which the terminal device currently camps; wherein determining, by the terminal device, the target initial BWP among the plurality of initial BWPs comprises: according to the measurement results of the plurality of SSB beams, determining a measurement result of each satellite beam of a plurality of satellite beams in the first cell, wherein each satellite beam is associated with a set of SSB beams and each satellite beam is associated with an initial BWP; according to the measurement result of each satellite beam, determining a target satellite beam among the plurality of satellite beams; and determining an initial BWP associated with the target satellite beam as the target initial BWP according to the association relationship; wherein determining, according to the measurement results of the plurality of SSB beams, the measurement result of each satellite beam of the plurality of satellite beams in the first cell comprises: selecting, among a set of measurement results of the set of SSB beams associated with each satellite beam, target measurement results of SSB beams, signal quality of which is higher than a second signal quality threshold and number of which does not exceed a first SSB number threshold, wherein the second signal quality threshold represents a minimum quality threshold to be met by a SSB beam used to determine a measurement result of a satellite beam, and the first SSB number threshold represents a maximum number of SSB beams used to determine the measurement result of the satellite beam; and determining a linear average value of the target measurement results of the SSB beams, as the measurement result of each satellite beam of the plurality of satellite beams in the first cell.

2. The method according to claim 1, wherein determining, according to the measurement result of each satellite beam, the target satellite beam among the plurality of satellite beams comprises: determining a satellite beam with the highest measurement result among the plurality of satellite beams as the target satellite beam; or determining a satellite beam with a measurement result greater than a first beam quality threshold among the plurality of satellite beams as the target satellite beam.

3. The method according to claim 2, wherein the first beam quality threshold is comprised in the initial BWP selection configuration information.

4. A method for selecting an initial Bandwidth Part (BWP), comprising: sending, by a network device, initial BWP selection configuration information to a terminal device in a non-connected state, wherein the initial BWP selection configuration information is used to configure a plurality of initial BWPs for the terminal device to perform initial access, and the initial BWP selection configuration information comprises an association relationship in which each initial BWP is associated with a set of SSB beams and the set of SSB beams are associated with a same satellite beam, and the initial BWP selection configuration information is carried in System Information Block 1 (SIB1) wherein the initial BWP selection configuration information is used for the terminal device to determine a target initial BWP among the plurality of initial BWPs configured by the initial BWP selection configuration information for a first cell according to measurement results of a plurality of SSB beams in the first cell, wherein the first cell is a cell upon which the terminal device currently camps; wherein determining of the target initial BWP among the plurality of initial BWPs comprises: according to the measurement results of the plurality of SSB beams, determining a measurement result of each satellite beam of a plurality of satellite beams in the first cell, wherein each satellite beam is associated with a set of SSB beams and each satellite beam is associated with an initial BWP; according to the measurement result of each satellite beam, determining a target satellite beam among the plurality of satellite beams; and determining an initial BWP associated with the target satellite beam as the target initial BWP according to the association relationship; wherein determining, according to the measurement results of the plurality of SSB beams, the measurement result of each satellite beam of the plurality of satellite beams in the first cell comprises: selecting, among a set of measurement results of the set of SSB beams associated with each satellite beam, target measurement results of SSB beams, signal quality of which is higher than a second signal quality threshold and number of which does not exceed a first SSB number threshold, wherein the second signal quality threshold represents a minimum quality threshold to be met by a SSB beam used to determine a measurement result of a satellite beam, and the first SSB number threshold represents a maximum number of SSB beams used to determine the measurement result of the satellite beam; and determining a linear average value of the target measurement results of the SSB beams, as the measurement result of each satellite beam of the plurality of satellite beams in the first cell.

5. The method according to claim 4, wherein the initial BWP selection configuration information comprises:
    a signal quality threshold which represents a minimum quality threshold to be met by a SSB beam used to determine a measurement result of a satellite beam; and
    a signal number threshold which represents a maximum number of SSB beams used to determine a measurement result of a satellite beam.

6. A terminal device, comprising: a processor; and a memory storing instructions executable by the processor; wherein when the instructions are executed by the processor, the terminal device is caused to: receive initial BWP selection configuration information sent from a network device, wherein the initial BWP selection configuration information is used to configure a plurality of initial BWPs for the terminal device to perform initial access, and the initial BWP selection configuration information comprises an association relationship in which each initial BWP is associated with a set of SSB beams and the set of SSB-beams are associated with a same satellite beam, and the initial BWP selection configuration information is carried in System Information Block 1 (SIB1); determine a target initial Bandwidth Part (BWP) among the plurality of initial BWPs configured by the initial BWP selection configuration information for a first cell according to measurement results of a plurality of SSB beams in the first cell, wherein-the first cell is a cell upon which the terminal device currently camps; wherein when the instructions are executed by the processor, the terminal device is caused to: according to the measurement results of the plurality of SSB beams, determine a measurement result of each satellite beam of a plurality of satellite beams in the first cell, wherein each satellite beam is associated with a set of SSB beams and each satellite beam is associated with an initial BWP; according to the measurement result of each satellite beam, determine a target satellite beam among the plurality of satellite beams; and determine an initial BWP associated with the target satellite beam as the target initial BWP according to the association relationship; wherein determining, according to the measurement results of the plurality of SSB beams, the measurement result of each satellite beam of the plurality of satellite beams in the first cell comprises: selecting, among a set of measurement results of the set of SSB beams associated with each satellite beam, target measurement results of SSB beams, signal quality of which is higher than a second signal quality threshold and number of which does not exceed a first SSB number threshold, wherein the second signal quality threshold represents a minimum quality threshold to be met by a SSB beam used to determine a measurement result of a satellite beam, and the first SSB number threshold represents a maximum number of SSB beams used to determine the measurement result of the satellite beam; and determining a linear average value of the target measurement results of the SSB beams, as the measurement result of each satellite beam of the plurality of satellite beams in the first cell.

7. The terminal device according to claim 6, wherein when the instructions are executed by the processor, the terminal device is caused to: determine a satellite beam with the highest measurement result among the plurality of satellite beams as the target satellite beam; or determine a satellite beams with a measurement result greater than a first beam quality threshold among the plurality of satellite beams as the target satellite beam.

8. The terminal device according to claim 7, wherein the first beam quality threshold is comprised in the initial BWP selection configuration information.

* * * * *